Aug. 25, 1942.   A. H. THOMPSON   2,294,054
NUT-LIKE LOCKING ELEMENT
Filed June 14, 1939
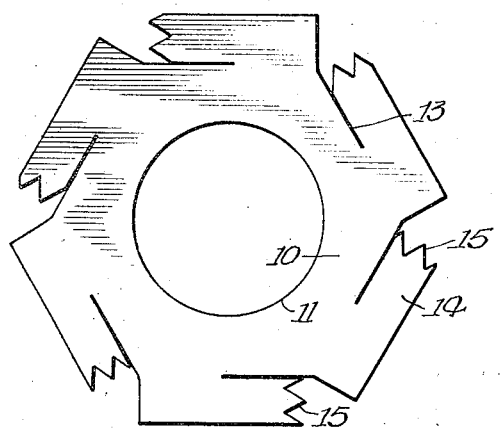
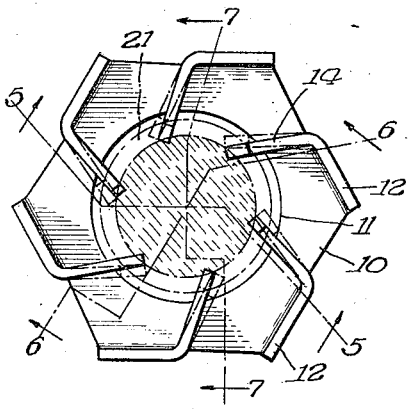
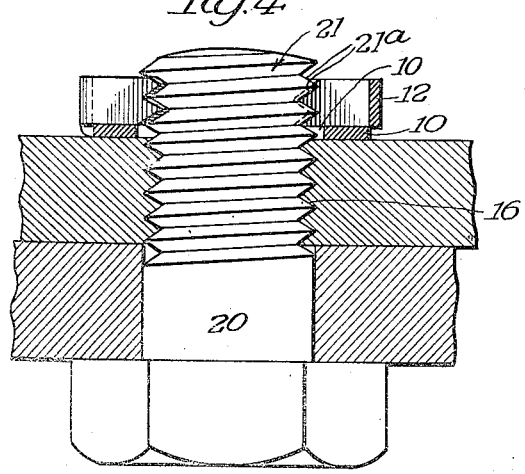
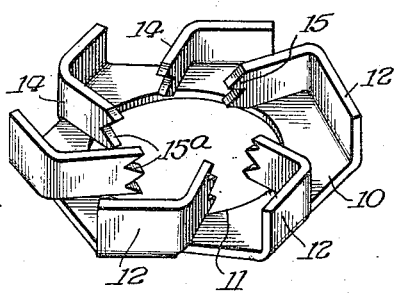
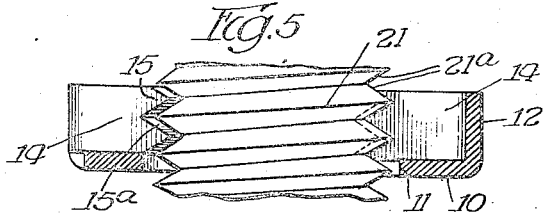
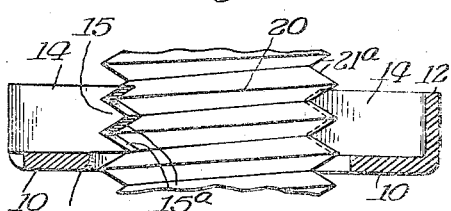
Inventor
Arthur H. Thompson
By Fred Gerlach, his Atty Patented Aug. 25, 1942

2,294,054

UNITED STATES PATENT OFFICE 2,294,054

NUTLIKE LOCKING ELEMENT

Arthur H. Thompson, Chicago, Ill., assignor to Thompson-Bremer & Co., Chicago, Ill., a corporation of Illinois Application June 14, 1939, Serial No. 278,989

4 Claims. (Cl. 151—14)

The invention relates to locking elements for screws.

One object of the invention is to provide an improved locking element for a screw which is formed of sheet metal and is provided with integral tongues which are slightly resilient and have their inner ends shaped to extend into the groove of the screw thread and engage the side-faces of the thread, the tongues being extended so that when the element is turned onto the screw the inner ends of the tongues will slide on the side-faces of the thread and when the element is turned or urged in the opposite direction the tongues will bite against the inclined side-faces of the screw thread and effectively lock the element against reverse rotation.

Another object of the invention is to provide a locking element which will function as a one-piece self-locking nut and is so constructed and designed that it will be securely locked against reverse rotation on the screw.

A further object of the invention is to provide a locking element of this character in which the tongues are upstanding from the plate and have a plurality of teeth at their inner ends which extend into a plurality of the convolutions of the groove and engage the inclined side-faces of the screw-thread for efficiently locking the element on the screw-thread.

Other objects of the invention will be apparent from a consideration of the following detailed description.

The invention consists in the several novel features which are hereinafter set forth and are more particularly defined by claims at the conclusion hereof.

In the drawing: Fig. 1 is a plan of a blank of sheet metal from which the locking-element is formed. Fig. 2 is a plan of the locking element. Fig. 3 is a perspective of the locking element. Fig. 4 is a section illustrating the locking element on a screw. Fig. 5 is a section on line 5—5 of Fig. 2. Fig. 6 is a section on line 6—6 of Fig. 2. Fig. 7 is a section on line 7—7 of Fig. 2.

The invention is exemplified in a locking-element which is formed of a blank of flat sheet metal of sufficiently heavy stock to function as a nut. The blank is cut to the shape shown in Fig. 1 and includes stock for providing a flat hexagonal plate 10 which serves as the body of the element. This plate is provided with a central hole 11 which permits the screw to pass longitudinally through the plate. The blank is provided with portions which are bent upwardly from one face of the plate 10 to form integral right-angle or upstanding flanges 12. The stock is slit, as at 13, adjacent the margin of the plate 10, to provide tongues 14 integral with flanges 12. These tongues extend inwardly transversely of the screw. Tongues 14 are upstanding and have their side-faces extending longitudinally of the screw. Each tongue is provided at its inner end with V-shaped teeth 15 which normally extend into the V-shaped groove of the screw-thread 21 of the screw 20 for which the element is designed. Tongues 14, by reason of the union between their outer ends and the flanges 12, are slightly resilient transversely of the screw and the teeth 15 are disposed to extend normally slightly within the diameter of the root of the thread. When the element is turned onto a screw the tongues will be sprung slightly outward by the screw, as indicated by dotted lines in Fig. 2.

The tongues extend radially so that they will be somewhat off the dead-center between their outer ends where they are joined to flanges 12 and the axis of the screw. This off-center relation is at that side of the dead-center which will, when the nut is rotated to turn it onto the screw, flex the tongues in the direction of rotation and thus permit the teeth on the tongues to resiliently engage and slide around the side-faces of the screw-thread.

When reverse rotational force is applied to the nut the resilient engagement of the sides of the teeth and the side-faces of the thread will force the inner ends of the teeth toward the dead-center and cause them to bite into the side-faces of the screw-thread and thereby automatically lock the nut against reverse rotation. This construction and arrangement of the tongues and teeth render the nut self-locking against reverse rotation independently of longitudinal pressure of the nut against the work so that if the nut is not tightly jammed against the work it will, none the less, be effectively locked against reverse rotation. The teeth 15 are provided with V-shaped end-faces 15ª which are shaped to conform substantially to the V-shaped groove and side-faces of the screw-thread so that, upon reverse rotation, the resistance of the tongues will produce a wedging fit of the teeth against the inclined side-faces of the thread. The teeth 15 on the tongues are helically arranged conformably to the screw-thread so that they will all normally engage the thread without longitudinal displacement or deformation. The lower edges of tongues 14 abut or frictionally grip the contiguous face of the plate 10 and, as a result, the stresses to which the tongues are subjected longitudinally of the screw when the nut is clamped against the work, are directly transmitted from the plate to the tongues and all of the tongues and teeth will be simultaneously and equally stressed to effectively hold the nut.

In Fig. 4 the nut is applied to a screw 20 which is provided with a V-shaped screw-thread 21 having inclined side-faces 21ᵃ.

In operation, one end of the screw is passed through hole 11 in plate 10 until the screw encounters the teeth 15 of the tongues 14. The nut is then turned around the screw by applying a wrench to the upstanding flanges 12 and then exerting rotative force on the wrench. During the initial turning movement the tongues 14 will be flexed outwardly slightly by the screw-thread to insure resilient engagement between faces 15ᵃ on the ends of the teeth 15 with the V-shaped side-faces of the screw-thread. The element, by reason of the transverse resiliency of the tongues 14 away from their dead-center positions, can be turned onto the screw until it has reached the desired position for locking the work or screw or another nut. If pressure is exerted or vibration is produced which impose reverse rotative force on the nut, the force on the teeth 15 will be directed to move the tongues toward their dead-center positions and cause the teeth to bite into the inclined side-faces of the screw-thread and thus lock the nut and screw against relative reverse rotation.

The element may be released for reverse rotation by a suitable tool which is adapted to apply pressure in a direction to disengage the tongues from the thread.

The element may be used as a clamping nut, without an auxiliary nut or may be used as a lock nut to lock a clamping nut.

A characteristic of the locking-element described is that the interfit between the inner ends of the self-locking transversely resilient tongues and the screw-thread constitutes the sole means on the element for moving it longitudinally of the screw into clamping position.

A characteristic of this construction is that engagement is effected between the ends of the tongues and the inclined faces of the screw-thread to produce more effective locking than when the outer or sharp edge of the screw is engaged, and this also avoids any cutting away of the sharp edge of the screw-thread.

Another characteristic of the element is that it may be used to function as a one-piece nut for a screw because it is inherently effective to clamp work without an additional nut, because longitudinal clamping pressure is not necessary since the resiliency of the tongues transversely is sufficient to produce the desired locking effect.

By providing each of the tongues with vertically extending faces and a plurality or sufficient number of teeth for engaging the side-faces of a plurality of the convolutions of the thread, the cumulative gripping effect is sufficient to cause the element to function independently as a self-locking nut.

Another characteristic is that the longitudinal stresses applied to the nut or element when it is clamped against the work are directly transmitted from plate 10 to the tongues which abut directly against the plate 10.

The invention is not to be understood as restricted to the details set forth, since these may be modified within the scope of the appended claims, without departing from the spirit and scope of the invention.

Having thus described the invention, what I claim as new and desire to secure by Letters Patent is:

1. As a new article of manufacture, a nut-like locking element for use with a plain screw, formed of a sheet metal stamping and comprising a plate with a central hole therein for receiving the screw, and a plurality of elongated tongues extending in an annular series around the hole in the plate and having the outer ends thereof anchored to the plate and their inner ends terminating adjacent the hole defining portion of the plate, said tongues having the side faces thereof extending substantially at right angles to the plate and embodying at their inner ends V-shaped teeth adapted when the screw and element are in assembled relation to fit between and engage the side faces of the thread of the screw and arranged so that the tooth on the inner end of each tongue is offset relatively to the teeth on the adjacent tongues in the direction of the axis of the hole and in such manner that the teeth as a group are helically arranged in phase with, or conformably to, the spiral of the thread, said tongues being laterally flexible and extending inwards in such direction that their inner teeth-equipped ends will slide on the side faces of the thread when the element is turned in one direction and will bite into said side faces of the thread when the element is urged rotatively in the opposite direction.

2. As a new article of manufacture, a nut-like locking element for use with a plain screw, formed of a one-piece sheet metal stamping and comprising a plate with a central hole therein for receiving the screw, and a plurality of elongated tongues at one side of the plate extending in an annular series around the hole and having the outer ends thereof connected to the outer marginal portion of the plate and their inner ends terminating adjacent the hole defining portion of the plate, said tongues having the side faces thereof extending substantially at right angles to the plate and their inner edges in abutment or frictional engagement with said one side of the plate and embodying at their inner ends series of V-shaped teeth adapted when the screw and element are in assembled relation to fit between and engage the side faces of the thread of the screw and arranged so that the teeth on the inner end of each tongue are offset relatively to the teeth on the adjacent tongues in the direction of the axis of the hole and in such manner that the teeth as a group are helically arranged in phase with, or conformably to, the spiral of the thread, said tongues being laterally flexible and extending inwards in such directions that their inner teeth-equipped ends will slide on the side faces of the thread when the element is turned in one direction and will bite into said side faces of the thread when the element is urged rotatively in the opposite direction.

3. As a new article of manufacture, a nut-like locking element for use with a plain screw, formed of a one-piece sheet metal stamping and comprising a polygonal plate with a central hole therein for receiving the screw, a plurality of equal length right angle flanges associated with, and joined to, the outer edge portions of the plate respectively and having certain of the ends thereof terminating adjacent the corners of the plate and their other ends terminating adjacent substantially the mid points of said outer edge portions, and an annular series of tongues corresponding in number to, and associated respectively with, the flanges and having the outer ends thereof joined to said other ends of the flanges and their inner ends terminating adjacent the hole defining portion of the plate, said tongues having the side faces thereof extending substantially at right angles to the plate and embodying at their inner ends V-shaped teeth adapted when the screw and element are in assembled relation to fit between and engage the side faces of the thread of the screw and arranged so that the tooth on the inner end of each tongue is offset relatively to the teeth on the adjacent tongues in the direction of the axis of the hole and in such manner that the teeth as a group are helically arranged in phase with, or conformably to, the spiral of the thread, said tongues being laterally flexible and extending inwards in such directions that their inner teeth-equipped ends will slide on the side faces of the thread when the element is turned in one direction and will bite into said side faces of the thread when the element is urged rotatively in the opposite direction.

4. As a new article of manufacture, a nut-like locking element for use with a plain screw, formed of a one-piece sheet metal stamping and comprising a polygonal plate with an over-sized central hole therein for receiving the screw, a plurality of equal length right angle flanges associated with, and joined to, the outer edge portions of the plate respectively and having certain ends thereof terminating adjacent the corners of the plate and their other ends terminating adjacent the mid points of said outer edge portions of the plate, and an annular series of tongues corresponding in number to, and associated respectively with, the flanges and having their outer ends joined to said other ends of the flanges and their inner ends projecting inwards of the hole defining portion of the plate, said tongues having the side faces thereof extending substantially at right angles to the plate and their inner side edges in abutment or frictional engagement with the adjacent side face of the plate and embodying at their inner ends V-shaped teeth adapted when the screw and element are in assembled relation to fit between and engage the side faces of the thread of the screw and arranged so that the tooth on the inner end of each tongue is offset relatively to the teeth on the adjacent tongues in the direction of the axis of the hole and in such manner that the teeth as a group are helically arranged in phase with, or conformably to, the spiral of the thread, said tongues being laterally flexible and extending inwards in such directions that their inner teeth-equipped ends will slide on the side faces of the thread when the element is turned in one direction and will bite into said side faces of the thread when the element is urged rotatively in the opposite direction.

ARTHUR H. THOMPSON.